July 8, 1941.    G. CAMILLI    2,248,608
PROTECTIVE DEVICE
Filed Jan. 3, 1940
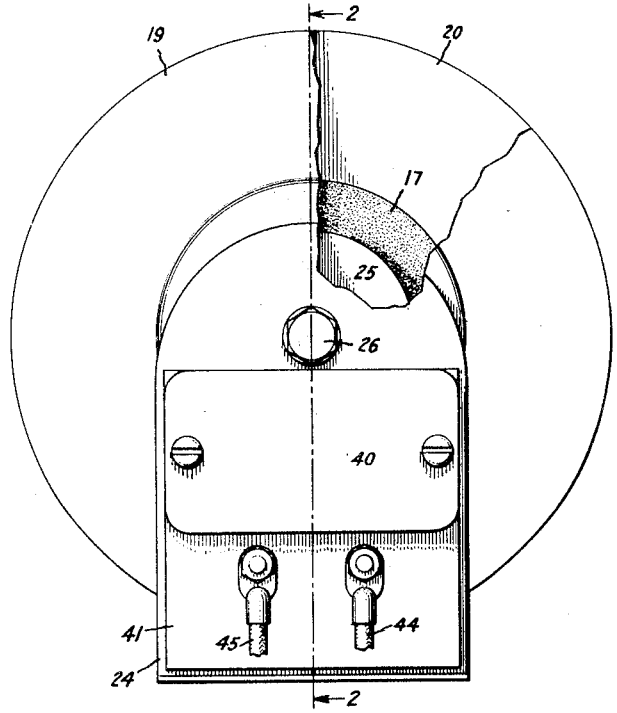
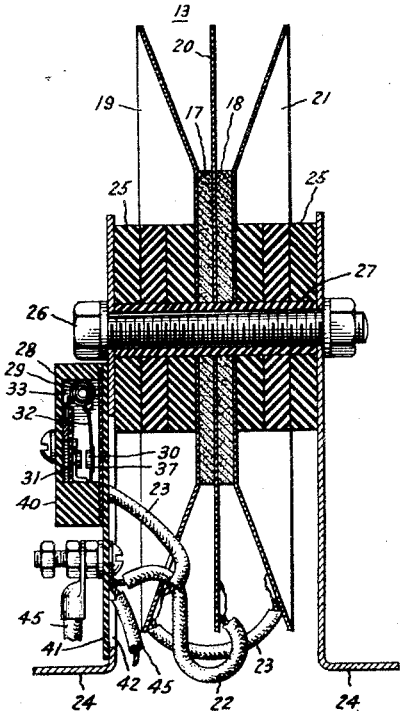
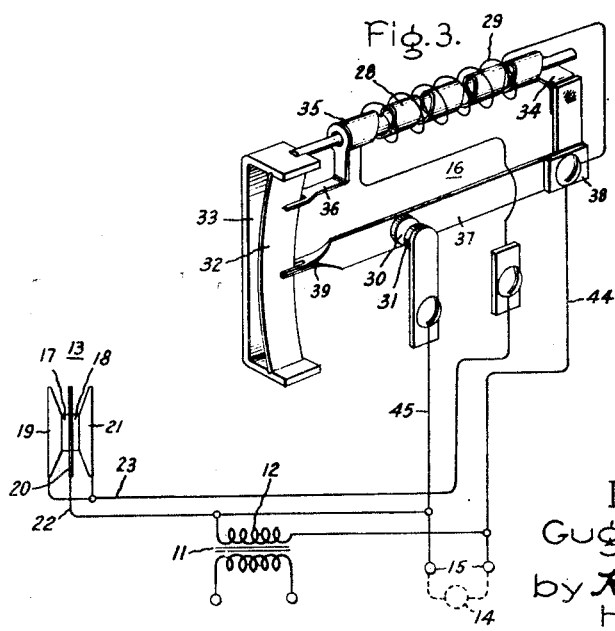
Inventor:
Guglielmo Camilli,
by Harry E. Dunham
His Attorney.

Patented July 8, 1941

2,248,608

UNITED STATES PATENT OFFICE 2,248,608

PROTECTIVE DEVICE

Guglielmo Camilli, Pittsfield, Mass., assignor to General Electric Company, a corporation of New York Application January 3, 1940, Serial No. 312,195

5 Claims. (Cl. 175—294)

My invention relates to protective devices and pertains particularly to apparatus for limiting over-voltage.

It is an object of my invention to provide arrangements for protecting current transformers, preventing excessive voltages in the secondary windings, and preventing destruction of protective shunts which may be connected across the secondary windings to limit the voltage.

Other and further objects and advantages will become apparent as the description proceeds.

In carrying out my invention in its preferred form I provide a protective resistor composed of material having a hyperbolic resistance-current characteristic for connection across the secondary winding of a current transformer. I also provide a thermal current relay having an inverse current-time characteristic with an operating winding connected in series with the protective resistor. The relay includes normally open contacts connected across the secondary winding of the transformer so that as the current builds up in the protective resistor as a result of an inadvertent disconnection of the normal burden from the current transformer, the current through the relay winding will cause the closing of its contacts to prevent the continuance of current flow through the protective resistor, which might otherwise be heated to destruction unless a resistor of uneconomical and inefficient size were employed.

The invention will be understood more readily from the following detailed description when considered in connection with the accompanying drawing and those features of the invention which are believed to be novel and patentable will be pointed out in the claims appended hereto. In the drawing, Figure 1 is a side elevation of apparatus forming one embodiment of my invention, a portion of the apparatus being broken away in order to expose the interior. Figure 2 is a vertical section of the apparatus of Figure 1 cut by the plane 2—2 and Figure 3 is a schematic diagram showing the electrical connections of the apparatus and a perspective representation of the relay. Like reference characters are utilized throughout the drawing to designate like parts.

Current transformers are employed both to insulate current measuring instruments from high-voltage alternating-current circuits and also to permit the measurement of high currents with ammeters designed for relatively small currents, such as the standard full scale deflection of five amperes, for example. Current transformers are designed to have their burden, in the form of ammeters or current coils of various types of instruments, meters and relays, continuously connected to the secondary winding. If the burden should inadvertently be disconnected, dangerously high voltages are produced in the secondary windings. These voltages must be guarded against both to avoid the hazard to human life and also to prevent the breakdown of insulation of the transformer.

In the arrangement illustrated, a current transformer 11 having a secondary winding 12 is provided with a protective resistor 13 connected across the secondary winding 12 to prevent the voltage from rising to excessive values. It will be understood that the normal burden of the current transformer, such as an ammeter 14, is connected to output terminals 15 which are also connected across the secondary winding 12. To prevent the protective resistor 13 from being destroyed by excessive current when the normal burden 14 is inadvertently not connected, a thermal current relay 16 is provided.

The protective resistor 13 is what is commonly called a non-ohmic resistor having a non-linear voltage-current characteristic. It is composed of some special form of resistance material which has the unique property of decreasing in resistance with increase in current, so that as the voltage across it rises slightly, causing an increase in current, the decrease in resistance prevents the voltage from increasing substantially regardless of the extent to which the magnitude of the current may rise. For this purpose a resistor may be employed consisting of a material having what may be called a hyperbolic resistance-current characteristic. That is to say the material satisfies the equation $RI^a = C$. This equation, expressed in terms of voltage, may be written $$I = K.E^{\frac{1}{1-a}} = K.E^b$$

Resistance, current and voltage are represented in the equation by the symbols $R$, $I$ and $E$, respectively, and $a$, $C$, $K$ and $b$ are constants determined by the material. Certain materials are available in which the exponent $a$ may be made very nearly unity, thus making the exponent $b$ relatively great. A suitable material is one of the type disclosed in Letters Patent of the United States 1,822,742 to Karl B. McEachron, assigned to the General Electric Company, granted September 8, 1931, for a discharge device and resistance material. Such a material may readily be produced having an exponent *a* approximately .9 making the exponent *b* approximately 10 so that the current through the resistor may rise very rapidly with a slight rise in voltage. As is known to those skilled in the art, this characteristic of the resistor is not a temperature effect but is independent of temperature. The material employed is preferably a mixture of silicon carbide and carbon with a suitable binder or of silicon carbide mixed with other suitable materials such as tungsten and molybdenum and the like, but it will be understood that any suitable material having the required property of decreasing in resistance with an increase of applied voltage may be employed.

In the arrangement illustrated in the drawing the protective resistor 13 consists of a pair of disks 17 and 18 composed of the non-ohmic resistance material and having the surfaces sprayed with a metallic coating to facilitate making good electrical and thermal contact. In order to provide heat-radiating fins the two resistor disks are placed between three disks 19, 20 and 21 composed of a material which is a good conductor of electricity and heat, such as copper, for example. The disks or fins 19, 20 and 21 extend well beyond the resistance disks 17 and 18 in order to provide ample radiation and convection surfaces for the dissipation of heat, and the outer heat radiating disks 19 and 21 are preferably dished in order to increase their efficiency in relation to the center disk 20. The disks 17 and 18 are arranged in parallel to form a resistor unit, electrical connections being made by means of a conductor 22 to the center disk 20 and a conductor 23 to the outer disks 19 and 21.

For mounting and supporting the resistor unit 13 a suitable frame work consisting of flanged plates 24, insulating spacing washers 25 and a clamping bolt 26 are provided. It will be understood that the heat radiating disks 19, 20 and 21 and the resistance disks 17 and 18 are provided with suitable openings to admit the bolt 26. Preferably an insulating sleeve 27 is provided around the bolt 26.

The thermal current relay 16 includes a helical bimetallic heat-responsive operating member 28, a current-conducting heat-producing operating winding 29 surrounding the bimetallic member 28, and a pair of contacts 30 and 31, the first of which is movable in response to twisting of the bimetallic helix 28. In order to give snap action to the movable contact 30 there is provided a bowed column spring 32 supported in a stiffly resilient U-member 33 supported by the stationary portion of the apparatus. The helix 28 is rigidly supported at one end 34 and the movable end 35 carries a forked crank 36 engaging the column spring 32 near one end thereof. The movable contact 30 is carried by a resilient strip 37 supported at one end 38 and formed as a fork 39 at the other end, engaging a center portion of the column spring 32.

The relay 16 is mounted in a suitable casing 40 of insulating material which may consist of a molded synthetic resin, for example. The relay casing 40 is secured against an insulating sheet 41 which in turn is mounted on one of the frame plates 24. To permit making connections to the disks 17 and 18 from the back of the plate 41, an opening 42 is preferably cut in one of the frame plates 24 and the insulating sheet 41 is mounted against the opening 42.

When the relay contacts 30 and 31 are open, external circuits may be traced between the output terminals 15 of the secondary winding 12 through the ammeter 14 and also through the conductor 22, the resistor unit 13, that is the disks 17 and 18 in parallel, the conductor 23, the relay-actuating heater winding 29, and a conductor 44. It will be understood that the primary winding of the transformer 11 is connected in series with a circuit in which the current is to be measured.

If the ammeter 14 should be inadvertently disconnected, removal of the burden would cause the voltage of the secondary winding 12 to rise. Although this rise in voltage is limited by the protective resistor 13, it is sufficient by reason of the characteristics of the resistor 13 to cause an increase in current through the relay heater winding 29, which thereupon moves the switch blade 37 and closes the contacts 30 and 31, which short circuit the winding 12 through the conductor 45, contacts 31 and 30, the blade 37 and the conductor 44, thereby terminating the current flow in the resistor disks 17 and 18 and preventing their destruction. As previously explained the material of which the resistor disks 17 and 18 is composed has the property of diminishing in resistance very rapidly with an increase in current so that a very slight rise in voltage produces a very great rise in current which, of course, places a burden on the transformer 11 and prevents rise in voltage to excessive values. Owing to this property of falling from a relatively high resistance to a relatively low one with slight changes in voltage, I may use a resistor unit 13, which under normal conditions, has such a high resistance as to have no observable effect on the current transformer 12, thus making it permissible to attach the protector system described in this application to existing current transformers in the field without any recalibration.

By utilizing resistance disks approximately 3 inches in diameter and ⅛ inch in thickness, I may limit the secondary voltage of the transformer to approximately 180 volts. So long as the secondary voltage remains below 80 volts the current through the disks 17 and 18 remains imperceptible. But when the voltage rises above 80 volts the current drawn exceeds 1.5 amperes. The thermal relay 16 is so set that current passing through the resistor unit 13 for prolonged periods of time at 80 volts causes the closing of the contacts 30 and 31. The relay 16 is so arranged as to have an inverse current-time characteristic. In case of very heavy transient current which might destroy the resistors 17 and 18 in a relatively short period of time, the relay 16 acts very quickly thus closing the contacts 30 and 31 almost instantaneously. On the other hand, in the case of small over-voltages gradually applied, the contacts 30 and 31 do not close until such a period of time has elapsed that the heating of the resistors 17 and 18 might become excessive. The closing of the contacts 30 and 31, of course, stops the flow of current through the heater wire 29 and after approximately two minutes the contacts 30 and 31 reopen as a result of the cooling of the winding 29. However, if the over-voltage is still present in the secondary winding 12, the contacts 30 and 31 begin to reclose, the characteristics of the resistors 17 and 18 preventing the voltage from exceeding 180 volts in any event. Fast snap action of the movable contacts 30 is obtained by reason of the fact that the bowed column spring 32 must be flexed in either one direction or the other, a relatively small motion of the actuating fork 36 at the end of the spring 32 being sufficient to snap it from the position shown in which spring 32 is concave forward to the position in which it is convex forward. Due to the fork 39 being at the center of the spring 32, relatively great motion of the blade 37, sufficient to produce positive opening and closing of the contacts, is provided.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. An over-voltage protector for current transformers comprising a protective resistor having a hyperbolic resistance-current characteristic, heat radiating fins of high thermal conductivity in intimate surface contact with the resistor and extending therebeyond, and a thermal relay with an inverse current-time characteristic, having a pair of normally open contacts adapted to be connected across the secondary winding of a current transformer to be protected and having an operating winding normally connected in series with the resistor to the said contacts, whereby a transformer winding connected to said contacts normally has a series circuit connection through said resistor and said operating winding and closure of the contacts short circuits such a transformer winding and shunts out the said resistor and relay operating winding.

2. An over-voltage protector for current transformers comprising a protective resistor comprising non-ohmic resistance material, and a relay with an inverse current-time characteristic, having a pair of normally open contacts adapted to be connected across the secondary winding of a current transformer to be protected and having an operating winding normally connected in series with the resistor to the said contacts, whereby a transformer winding connected to said contacts normally has a series circuit connection through said resistor and said operating winding and closure of the contacts short circuits such a transformer winding and shunts out the said resistor and relay operating winding.

3. A voltage limiter for an electrical circuit comprising a voltage limiting resistor having an hyperbolic resistance-current characteristic, and a relay for protecting the resistor against prolonged excessive current, said relay having a pair of normally open contacts adapted to be connected across the electrical circuit in which voltage is to be limited, and an operating winding normally connected in series with the resistor across the said electrical circuit, whereby said electrical circuit normally has a series connection through said resistor and said relay operating winding and closure of the contacts short circuits said electrical circuit and shunts out the said resistor and relay operating winding, said operating winding being dimensioned to close the said contacts when the current reaches a value which would damage the resistor during the period of current duration, whereby the resistor protects the electrical circuit against overvoltage and the relay in turn protects the resistor against over-heating.

4. A current transformer having a secondary winding, an open circuit protective resistor therefor comprising non-ohmic resistance material which falls off in resistance in response to increase in voltage independent of temperature effects, and a relay with an inverse current-time characteristic having a pair of normally open contacts connected to the respective ends of the secondary winding of the current transformer and having an operating winding normally connected in series with the resistor to the said contacts, whereby the said transformer winding normally has a series circuit connection through said resistor and said relay operating winding and closure of the contacts short circuits the said transformer winding and shunts out the said resistor and relay operating winding.

5. The combination of a current transformer having a secondary winding, an open circuit protective resistor therefor having an hyperbolic resistance-current characteristic, and a relay having a pair of normally open contacts connected to the ends of the secondary winding of the current transformer and having an operating winding normally connected in series with the resistor to the said contacts, whereby the said transformer winding normally has a series circuit connection through said resistor and said relay operating winding and closure of the contacts short circuits the said transformer winding and shunts out the said resistor and relay operating winding, said current transformer being designed for normally having a burden connected to the secondary winding and having the characteristic of producing unsafe secondary voltages when the burden is accidentally disconnected, said protective resistor and said relay being so dimensioned that, when the secondary voltage rises sufficiently to cause a burden current to flow through the protective resistor sufficient in value to limit the secondary voltage to a safe value, the said burden current is of sufficient magnitude to close the contacts of the relay, whereby the protective resistor is itself protected against over-heating.

GUGLIELMO CAMILLI.